United States Patent
Yokoyama et al.

(10) Patent No.: US 10,654,113 B2
(45) Date of Patent: May 19, 2020

(54) CUTTING METHOD AND CUTTING APPARATUS

(71) Applicant: JTEKT CORPORATION, Osaka-shi, Osaka (JP)

(72) Inventors: Takashi Yokoyama, Seto (JP); Masami Narisawa, Kitakatsuragi-gun (JP); Shogo Kuroyanagi, Okazaki (JP); Yoshinobu Shichiri, Hikone (JP)

(73) Assignee: JTEKT CORPORATION, Osaka (JP)

( * ) Notice: Subject to any disclaimer, the term of this patent is extended or adjusted under 35 U.S.C. 154(b) by 58 days.

(21) Appl. No.: 15/868,385

(22) Filed: Jan. 11, 2018

(65) Prior Publication Data

US 2018/0207730 A1   Jul. 26, 2018

(30) Foreign Application Priority Data

Jan. 20, 2017 (JP) .................................. 2017-008716
Nov. 9, 2017 (JP) .................................. 2017-216520

(51) Int. Cl.

| | |
|---|---|
| B23B 1/00 | (2006.01) |
| B23B 39/02 | (2006.01) |
| B23B 31/40 | (2006.01) |
| B23B 27/12 | (2006.01) |
| B23B 27/08 | (2006.01) |
| B23B 29/03 | (2006.01) |
| B23B 35/00 | (2006.01) |

(52) U.S. Cl.
CPC ................ *B23B 39/02* (2013.01); *B23B 1/00* (2013.01); *B23B 27/08* (2013.01); *B23B 27/12* (2013.01); *B23B 29/03* (2013.01); *B23B 31/4073* (2013.01); *B23B 35/00* (2013.01); *B23B 2200/3618* (2013.01); *B23B 2205/04* (2013.01); *B23B 2215/72* (2013.01)

(58) Field of Classification Search
CPC ..... B23B 39/02; B23B 27/12; B23B 31/4073; B23B 1/00; B23B 35/00; B23B 5/38; B23Q 3/12
See application file for complete search history.

(56) References Cited

U.S. PATENT DOCUMENTS

| | | | | |
|---|---|---|---|---|
| 2011/0197723 | A1* | 8/2011 | Sjoo ........................ | B23B 27/12 82/1.11 |
| 2011/0318117 | A1* | 12/2011 | de Souza Filho ...... | B23B 27/12 407/11 |
| 2014/0167369 | A1* | 6/2014 | Zeng ....................... | B23B 31/10 279/126 |

FOREIGN PATENT DOCUMENTS

JP        2006-068831 A       3/2006

* cited by examiner

*Primary Examiner* — Alan Snyder
(74) *Attorney, Agent, or Firm* — Oliff PLC

(57) ABSTRACT

A method for cutting an inner circumferential surface of a rotating hollow cylindrical workpiece includes: holding the workpiece with a chucking device such that a side surface of the workpiece on a first side in an axial direction of the workpiece is in contact with a contact surface of the chucking device; setting an intersection angle between a rotational center line of the workpiece and an imaginary straight line to an angle smaller than 45 degrees, the straight line being parallel to an axis line of a button tip and intersecting with the rotational center line; and setting a feed direction of the button tip to the inner circumferential surface to a direction from a second side in the axial direction of the workpiece toward the first side in the axial direction thereof, and cutting the inner circumferential surface by use of the button tip rotating about the axis line.

15 Claims, 10 Drawing Sheets

CUTTING METHOD AND CUTTING APPARATUS

INCORPORATION BY REFERENCE

The disclosure of Japanese Patent Application No. 2017-008716 filed on Jan. 20, 2017 and No. 2017-216520 filed on Nov. 9, 2017 including the specification, drawings and abstract, is incorporated herein by reference in its entirety.

BACKGROUND OF THE INVENTION

1. Field of the Invention

The present invention relates to a method for cutting a hollow cylindrical workpiece and a cutting apparatus for carrying out the method.

2. Description of Related Art

Rotary cutting is known as a way to cut a hollow cylindrical workpiece to obtain a certain shape. For the rotary cutting, a button tip (hereinafter, called a tip) is mounted at a distal end of a tool mounted on a head of a processing apparatus. The rotary cutting is a method for cutting the workpiece by rotating the workpiece and the tool (tip) while the tip is being fed (refer, for example, to Japanese Patent Application Publication No. 2006-68831 (JP 2006-68831 A)).

As illustrated in FIG. 9, in the conventional rotary cutting, when a rotational center line Cx of a workpiece 90 is horizontal, the direction of an axis line C1 of a linear tool 99 is set to a direction inclined by 30 degrees or smaller (A 30 degrees) with respect to the vertical direction. The feed direction of the tool 99 (tip 98) is an arrow Y1 direction (direction close to a radial direction of the tip 98) in FIG. 9. The axis line of the tip 98 coincides with the axis line C1 of the tool 99. The tip 98 is rotated by rotation of the tool 99 about the axis line C1. In the case of the rotary cutting, since the tip 98 rotates, the life of the tip 98 is longer and the processing efficiency is higher than in the case of ordinary single point processing.

As illustrated in FIG. 9, the hollow cylindrical workpiece 90 is held at an end portion 91 in an axial direction thereof by a chucking device 95. When the cutting begins, a large cutting resistance is generated between the workpiece 90 and the tool 99. This cutting resistance is large in an arrow X direction (tangential direction of the workpiece 90) in FIG. 9. Accordingly, the chucking device 95 needs to firmly hold the workpiece 90. That is, the chucking device 95 illustrated in FIG. 9 is configured to hold the hollow cylindrical workpiece 90 by catching it from a radially inner side of the workpiece 90. The direction of supporting the workpiece 90 by holding it in this manner is the same as (parallel to) the direction (arrow X direction) of the above-described cutting resistance acting on the workpiece 90. A large holding force is therefore required for the chucking device 95 to resist the large cutting resistance. In particular, the cutting resistance further increases if the workpiece 90 has high hardness after heat treatment. The holding force of the chucking device 95 only needs to be increased according to the cutting resistance. In this case, however, the workpiece 90 is distorted, and deteriorates in accuracy after the processing. The rotary cutting is therefore generally considered unsuitable for finishing.

If the workpiece 90 is hollow cylindrical, the conventional rotary cutting method as illustrated in FIG. 9 can be employed for cutting an outer circumference of the workpiece 90. However, this method cannot be directly employed for cutting an inner circumference. That is, feeding the tool 99 (tip 98) in the arrow Y1 direction causes the tool 99 to interfere with the workpiece 90, so that the cutting cannot be performed. To prevent the interference, as illustrated in FIG. 10, a protruding length L of the tool 99 only needs to be increased. In this case, however, the tool 99 decreases in stiffness to make the cutting difficult. As described above, due to the arrangement relation between the tool 99 and the workpiece 90, the rotary cutting is used for cutting the outer circumference of the workpiece 90.

SUMMARY OF THE INVENTION

It is an object of the present invention to provide a method that allows cutting performed by rotating a workpiece and a button tip to be also applied to an inner circumference of a hollow cylindrical workpiece, and that ensures high processing accuracy, and to provide a cutting apparatus that carries out the method.

According to an aspect of the present invention, a cutting method for cutting an inner circumferential surface of a rotating hollow cylindrical workpiece by use of a linear tool with a button tip mounted at a distal end thereof includes: holding the workpiece with a chucking device in a state where a side surface of the workpiece on a first side in an axial direction of the workpiece is in contact with a contact surface of the chucking device; setting an intersection angle between a rotational center line of the workpiece and an imaginary straight line to an angle smaller than 45 degrees, the imaginary straight line being parallel to an axis line of the button tip and intersecting with the rotational center line of the workpiece; and setting a feed direction of the button tip to the inner circumferential surface of the workpiece to a direction from a second side in the axial direction of the workpiece toward the first side in the axial direction thereof, and cutting the inner circumferential surface of the workpiece by use of the button tip rotating about the axis line.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
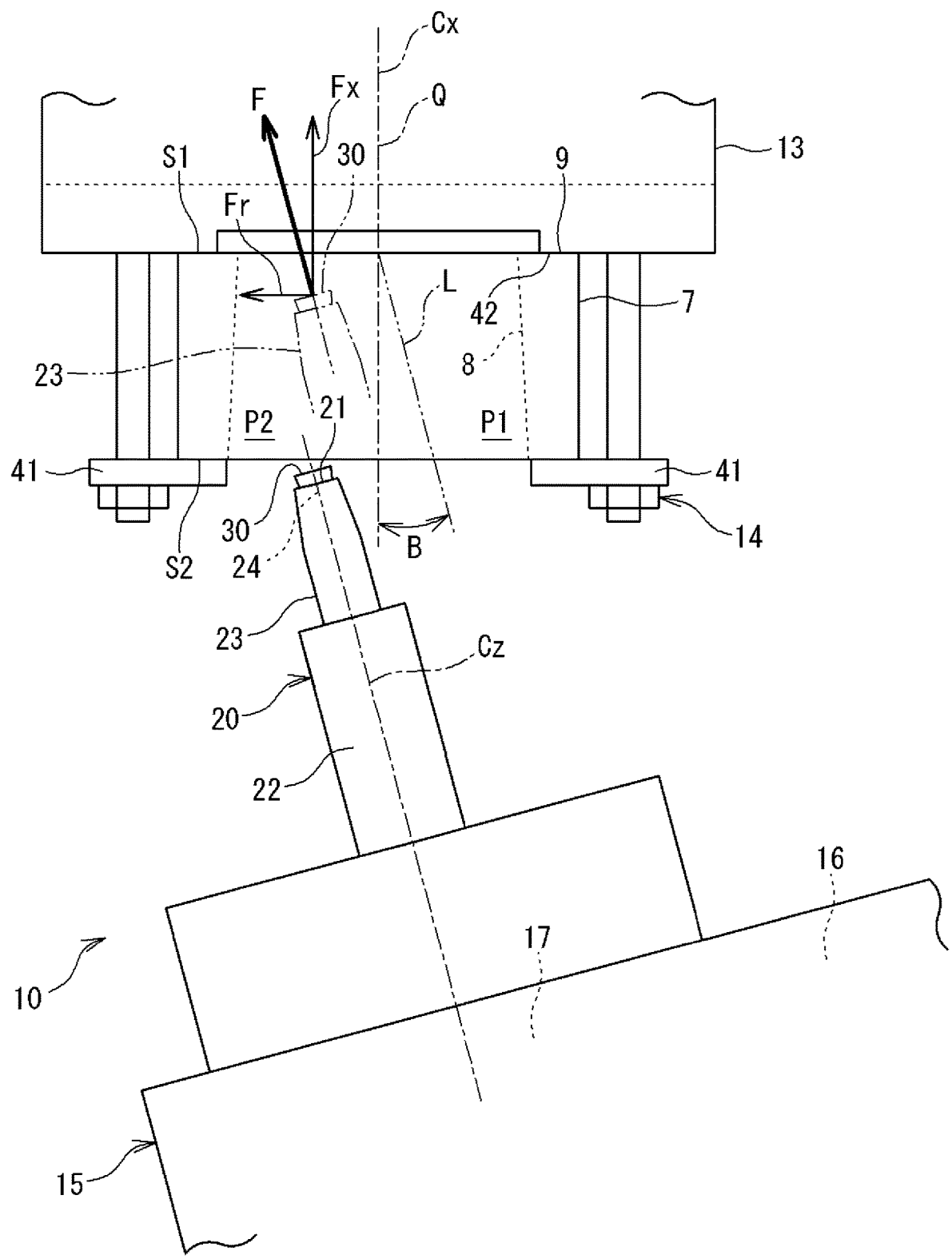
FIG. 1 is a plan view illustrating an embodiment of a part of a cutting apparatus of the present invention and a workpiece to be processed.

FIG. 1 is a plan view illustrating an embodiment of a part of a cutting apparatus of the present invention and a workpiece to be processed. A cutting apparatus 10 includes a chucking device 14 that holds a workpiece 7, a linear tool 20, a head 15 that rotatably supports the tool 20, and a feed mechanism 16 that feeds the tool 20 in a predetermined direction. The chucking device 14, the head 15, and the feed mechanism 16 are mounted on an apparatus body (not illustrated) installed on a floor.

Figure 6:
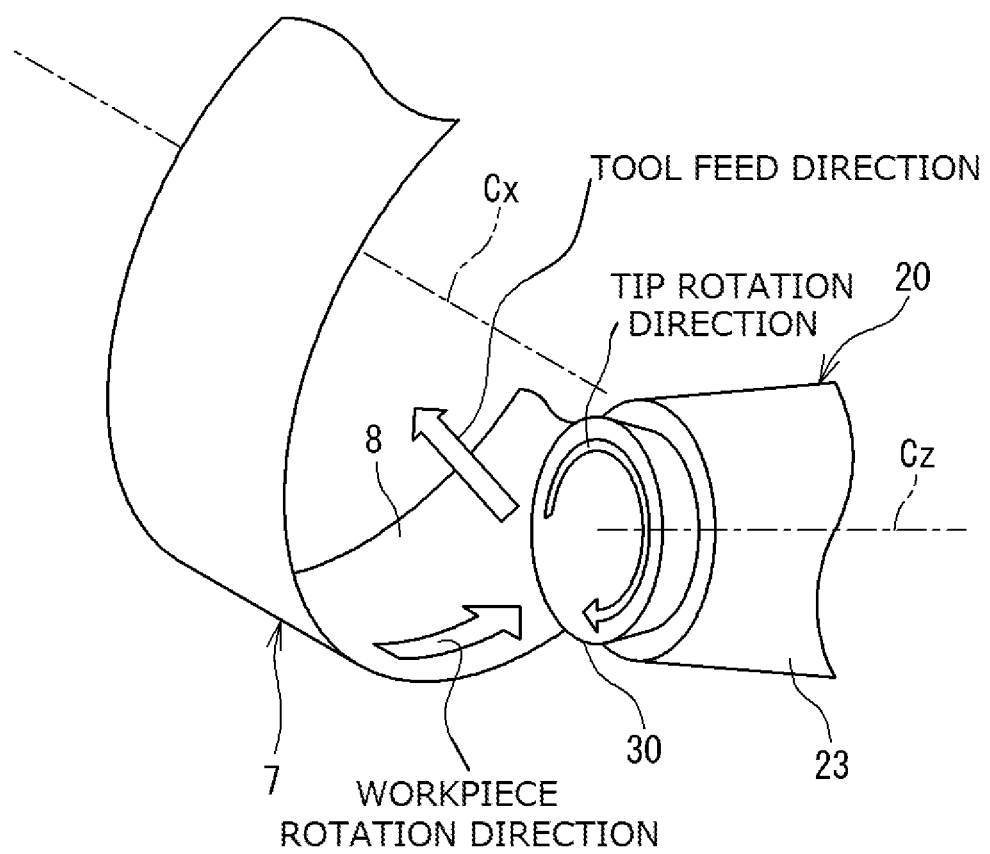
FIG. 6 is an explanatory diagram of an inner circumferential surface of the workpiece and a tip.

A button tip 30 (hereinafter, called a tip 30) is mounted at a distal end 21 of the tool 20 extending from the head 15 of the cutting apparatus 10. As illustrated in FIGS. 1 and 6, the cutting apparatus 10 is a rotary cutting apparatus that cuts the workpiece 7 by rotating the workpiece 7 and the tool 20 (tip 30) while feeding the tip 30. The workpiece 7 is a hollow cylindrical member, and an inner circumferential surface 8 thereof is cut by the cutting apparatus 10. Examples of the workpiece 7 include bearing rings (an inner ring and an outer ring) of a tapered roller bearing and bearing rings (an inner ring and an outer ring) of a cylindrical roller bearing. In the present embodiment, the outer ring of a tapered roller bearing serves as the target of processing.

In FIG. 1, the chucking device 14 is provided on a work spindle 13 included in the apparatus body (not illustrated), and rotates about a center line Cx of the work spindle 13. In the present embodiment, the center line Cx is horizontal. The chucking device 14 includes a mechanism that catches the workpiece 7. In the present embodiment, the chucking device 14 includes a plurality of jigs 41. The jigs 41 are provided in a circumferential direction, and sandwich the workpiece 7 from an axial direction thereof so as to fix the workpiece 7. For this purpose, the chucking device 14 has a contact surface 42 that contacts a side surface 9 of the workpiece 7 on a first side S1 (upper side in FIG. 1) in the axial direction of the workpiece 7 (upper side in FIG. 1). The workpiece 7 is held with the side surface 9 being in contact with the contact surface 42. The work spindle 13 is configured to stably receive, via the contact surface 42, a force in the axial direction that acts on the workpiece 7 due to a tightening force by the jigs 41 and a cutting resistance (described later) generated during the cutting. The work spindle 13 and the chucking device 14 rotationally drive the workpiece 7 about the center line Cx to rotate the workpiece 7 about the center line Cx. The center line Cx serves as a rotational center line of the workpiece 7. Hereinafter, reference numeral "Cx" denotes the rotational center line of the workpiece 7.

The tool 20 includes a linear shaft portion 22 and a holder 23, on which the tip 30 is mounted with a bolt 24. The linear shaft portion 22 and the holder 23 are linearly arranged to form the linear tool 20, and the tip 30 is mounted at the distal end of the tool 20. The tip 30 is generally widely used, and has a circular truncated cone shape. The axis line (center line) of the tool 20 and the axis line (center line) of the tip 30 are located on the same straight line. That is, the axis line of the tool 20 is common to the axis line of the tip 30, and reference numeral "Cz" denotes the axis line.

The head 15 rotatably supports the tool 20 (linear shaft portion 22). The rotary cutting is divided into two types, that is, a driven type in which the tip 30 rotates accompanying the rotation of the workpiece 7 and a driving type in which the tip 30 rotates by itself. In the present invention, either the driven type or the driving type may be used. For example, the head 15 includes a clutch mechanism, and the rotary cutting can be of the driving type by transmitting the torque of a motor provided on the apparatus body to the tool 20 (by connecting the clutch), and can be of the driven type by disconnecting the clutch to allow the tool 20 to idly rotate.

Figure 2:
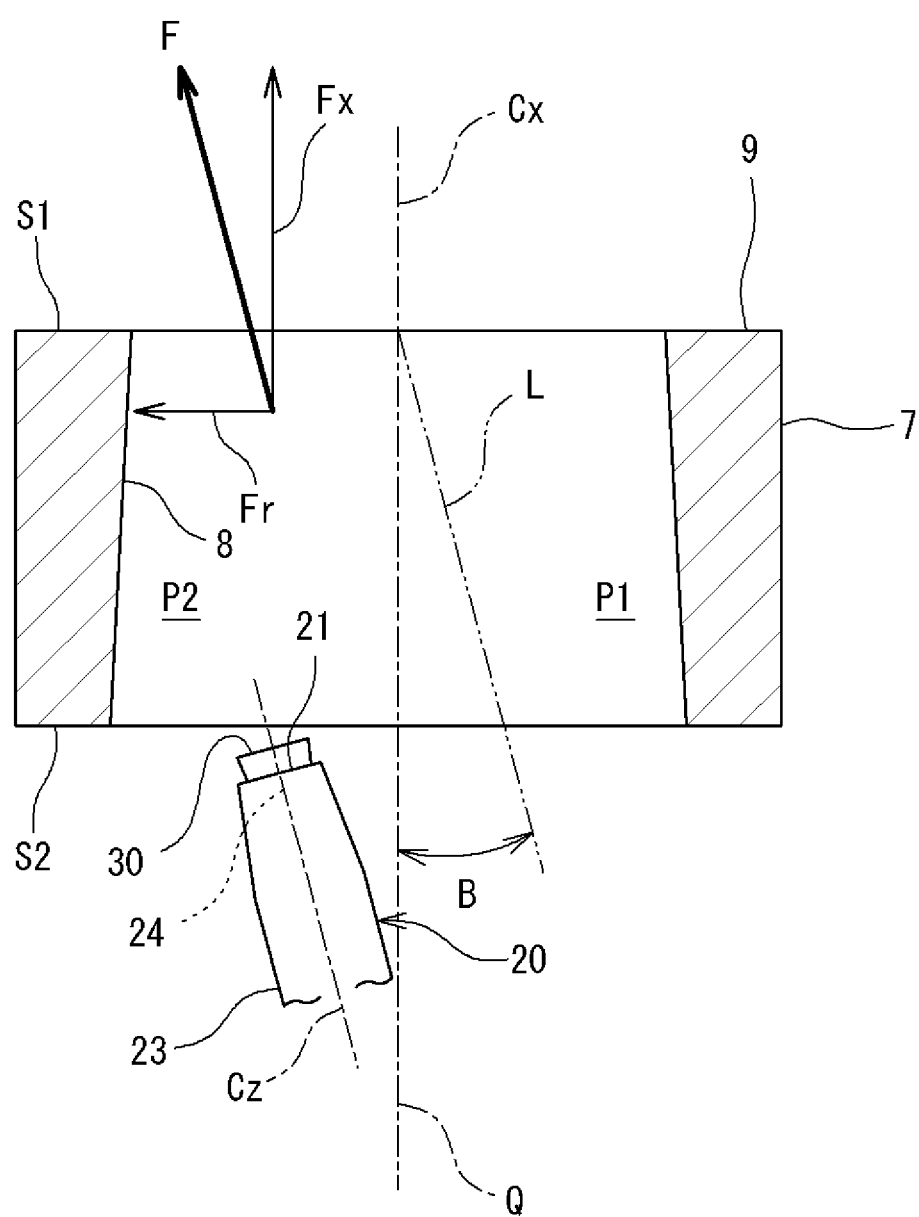
FIG. 2 is a simplified plan view of the workpiece and a tool.
Figure 3:
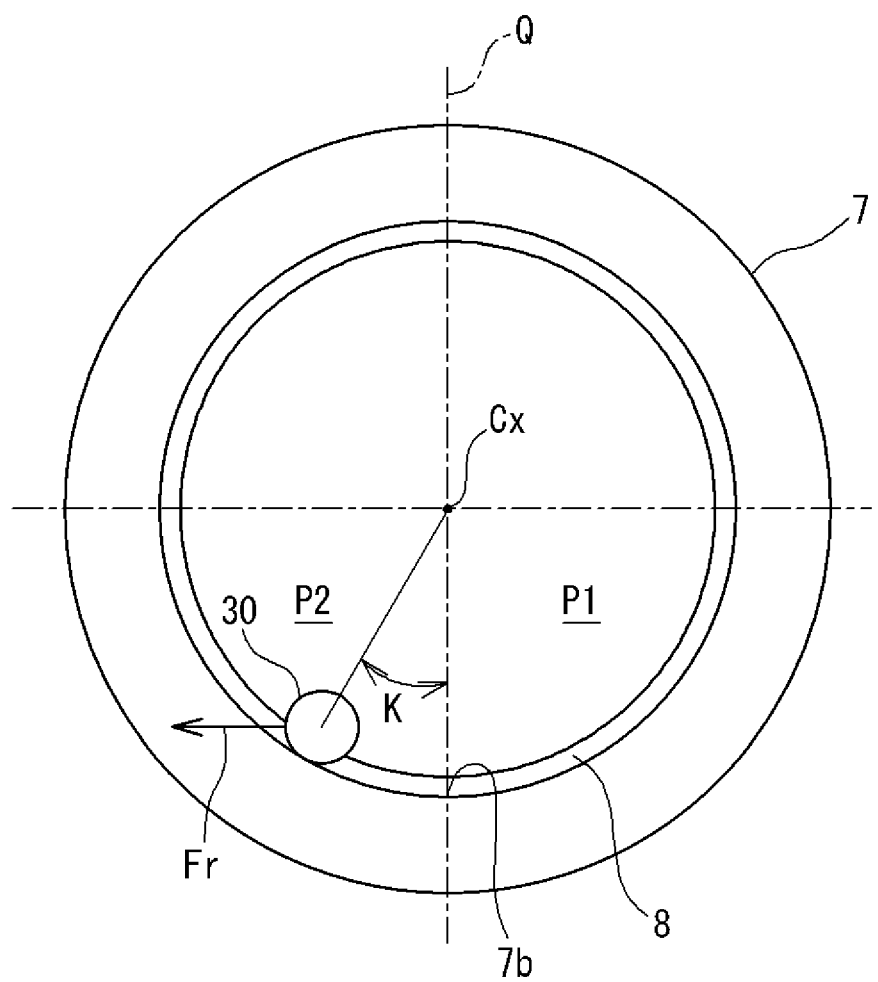
FIG. 3 is a front view of the workpiece and the tool in FIG. 2, as viewed from a direction along a rotational center line.
Figure 4:
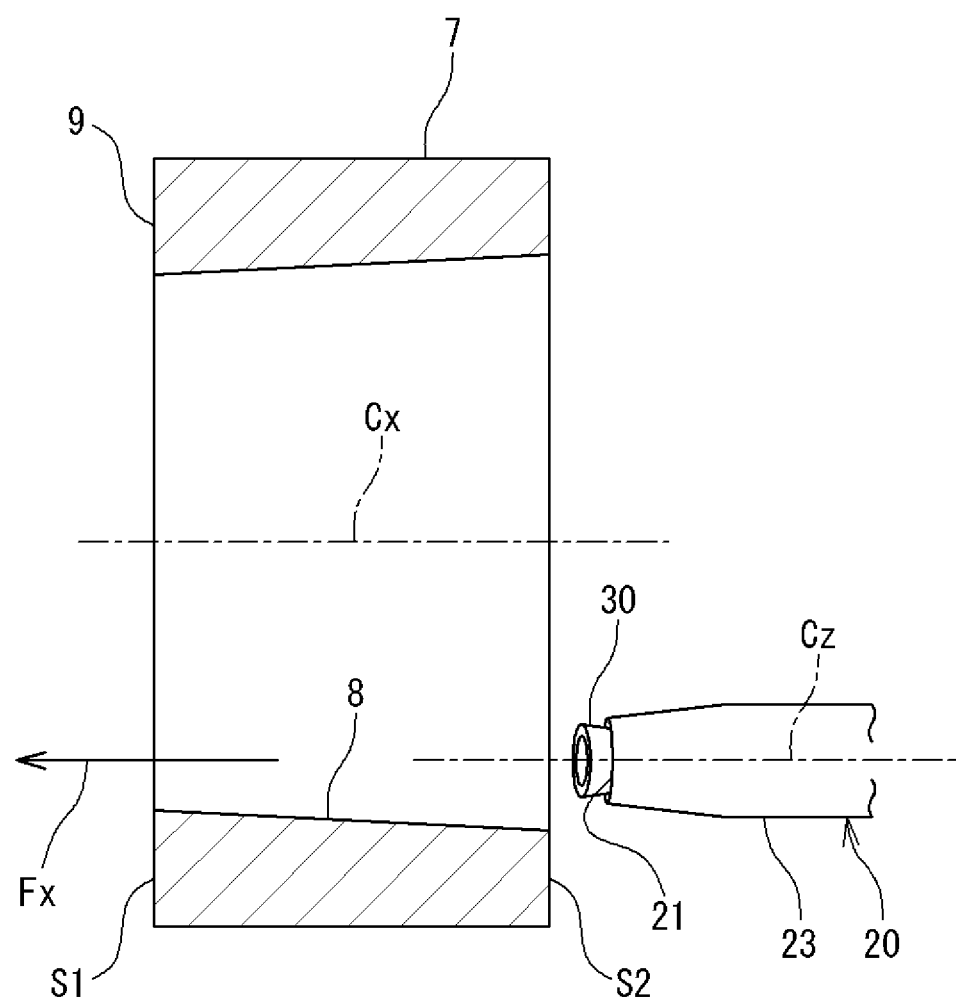
FIG. 4 is a side view of the workpiece and the tool in FIG. 2, as viewed from a direction orthogonal to the rotational center line.

FIG. 2 is a simplified plan view of the workpiece 7 and the tool 20. FIG. 3 is a front view of the workpiece 7 and the tool 20 in FIG. 2 as viewed from a direction along the rotational center line Cx. FIG. 4 is a side view of the workpiece 7 and the tool 20 in FIG. 2 as viewed from a horizontal direction that is orthogonal to the rotational center line Cx. FIGS. 2 and 4 illustrate the workpiece 7 as sections. As illustrated in FIGS. 2, 4, and 6, the rotational center line Cx and the axis line Cz are in a skewed positional relation with each other.

As a result, as illustrated in FIG. 1, the head 15 is placed so as to be oriented with respect to the apparatus body such that the longitudinal direction of the tool 20, that is, the direction of the axis line Cz of the tip 30 is oriented in a predetermined direction. In the present embodiment, the tool 20 is mounted on the head 15 such that an intersection angle B between the rotational center line Cx of the workpiece 7 and an imaginary straight line L parallel to the axis line Cz of the tip 30 and intersecting with the rotational center line Cx is smaller than 45 degrees. In the present embodiment, the head 15 is inclined with respect to the work spindle 13 so as to achieve the intersection angle B.

The intersection angle B only needs to be smaller than 45 degrees (B<45 degrees), preferably equal to or smaller than 30 degrees (B≤30 degrees), and more preferably equal to or smaller than 20 degrees (B≤20 degrees). The lower limit value of the intersection angle B is preferably 5 degrees (B≥5 degrees).

The feed mechanism 16 (refer to FIG. 1) may include a motor (servomotor), a speed reducer for reducing the speed of a motor output, and a ball screw rotated by the motor. The feed mechanism 16 is a mechanism for moving the head 15 in a predetermined direction. In the present embodiment, for the cutting work, the feed mechanism 16 linearly moves the head 15 in a direction from a second side S2 toward the first side S1 in the axial direction of the workpiece 7. By moving the head 15 as described above, the feed mechanism 16 can set the feed direction of the tip 30 with respect to the inner circumferential surface 8 of the workpiece 7 to the direction from the second side S2 toward the first side S1 in the axial direction of the workpiece 7. The inner circumferential surface 8 of the workpiece 7 illustrated in FIG. 1 has a tapered shape. Accordingly, the feed direction of the tip 30 is set to a direction along the tapered shape from the second side S2 toward the first side S1 in the axial direction of the workpiece 7. The feed direction of the tip 30 is set to a direction inclined by an inclination angle for forming the tapered shape with respect to the rotational center line Cx. This setting enables the cutting at a constant depth of cut into the inner circumferential surface 8. The inner circumferential surface 8 of the workpiece 7 may have a cylindrical surface shape. In this case, the feed direction of the tip 30 is set to a direction parallel to the rotational center line Cx from the second side S2 toward the first side S1 in the axial direction of the workpiece 7.

The following describes a cutting method carried out by the cutting apparatus having the configuration described above (refer to FIG. 1). First, the workpiece 7 is held by the chucking device 14 with the side surface 9 on the first side S1 in the axial direction of the workpiece 7 being in contact with the contact surface 42 of the chucking device 14. The intersection angle B between the rotational center line Cx of the workpiece 7 and the imaginary straight line L parallel to the axis line Cz of the tip 30 and intersecting with the rotational center line Cx is set smaller than 45 degrees. The feed direction of the tip 30 with respect to the inner circumferential surface 8 of the workpiece 7 is set to the direction from the second side S2 toward the first side S1 in the axial direction of the workpiece 7. The tip 30 rotating about the axis line Cz cuts the inner circumferential surface 8 of the workpiece 7 rotating about the rotational center line Cx.

In the cutting method described above, the direction of the axis line Cz of the tool 20 and the tip 30 is closer to the axial direction of the workpiece 7 as the intersection angle B, which is smaller than 45 degrees, is smaller. Therefore, when the inner circumferential surface 8 is cut, the cutting can be performed without interference of the tool 20 with the workpiece 7. In the mode illustrated in FIG. 1, the intersection angle B is set to 15 degrees.

The cutting is performed while the tip 30 is fed in the direction from the second side S2 toward the first side S1 in the axial direction of the workpiece 7 as described above. During this cutting, a large cutting resistance F acts between the tip 30 and the workpiece 7. In the drawings, an arrow Fx denotes a component of the cutting resistance F parallel to the rotational center line Cx, and an arrow Fr denotes a component of the cutting resistance F orthogonal to the rotational center line Cx. According to the cutting method of the present embodiment, the intersection angle B is set to the small value of 15 degrees. This setting makes the direction of the axis line Cz of the tip 30 closer to the axial direction of the workpiece 7 (that is, the axis line Cz becomes closer to parallel to the rotational center line Cx). Accordingly, the cutting resistance F acting on the workpiece 7 is large in the axial direction of the workpiece 7 (in the direction parallel to the rotational center line Cx), as represented by the arrow Fx, and is small in the direction orthogonal to the axial direction, as represented by the arrow Fr. In the cutting method of the present embodiment, the side surface 9 on the first side S1 in the axial direction of workpiece 7 is in contact with the contact surface 42 with the workpiece 7 being held by the chucking device 14. Although the component of the cutting resistance in the arrow Fx direction is large, the contact surface 42 can receive this component and can stably support the workpiece 7. Since the component of the cutting resistance in the arrow Fr direction is small, the chucking device 14 only needs to hold the workpiece 7 with a holding force sufficient for resisting the small cutting resistance component. Thus, the distortion of the workpiece 7 due to the holding force of the chucking device 14 can be reduced, and high processing accuracy can be ensured. The cutting of the present embodiment can ensure the high processing accuracy, and therefore can be applied not only to rough processing, but also to finishing. Even if the workpiece 7 is made of steel and has become harder after heat treatment (quenching), the cutting of the present embodiment can be applied thereto.

In the present embodiment, as illustrated in FIG. 3, the tip 30 is in contact with the inner circumferential surface 8 of the workpiece 7 at a location at a predetermined phase angle K from to a lower point (bottom point) 7b of the workpiece 7. The feed mechanism 16 feeds the tip 30 from the second side S2 toward the first side S1 in the axial direction of the workpiece 7 while maintaining the phase angle K. This phase angle K makes the linear shaft portion 22 of the tool 20 (refer to FIG. 1) more difficult to interfere with the hollow cylindrical workpiece 7. That is, in FIGS. 1, 2, and 3, with respect to a vertical imaginary plane Q including the rotational center line Cx of the workpiece 7, assume a first region P1 to be on one side (right side in FIGS. 1, 2, and 3) of the vertical imaginary plane Q in the horizontal direction, and a second region P2 to be on the other side of the vertical imaginary plane Q in the horizontal direction. In this case, the linear shaft portion 22 included in the tool 20 is disposed such that the linear shaft portion 22 extends from the first region P1 side to the second region P2 side and that the distal end faces the second region P2. The tip 30 mounted at the distal end 21 comes in contact with the inner circumferential surface 8 of the workpiece 7 in the second region P2. When the tool 20 is disposed in this manner and cut, the linear shaft portion 22 of the tool 20 is difficult to interfere with the workpiece 7. Thus, the inner circumferential surface 8 can be cut even when the workpiece 7 is long in the axial direction. The phase angle K may be set larger than 0 degrees and equal to or smaller than 45 degrees (0<K≤45). The phase angle may alternatively be 0 degrees.

Figure 5:
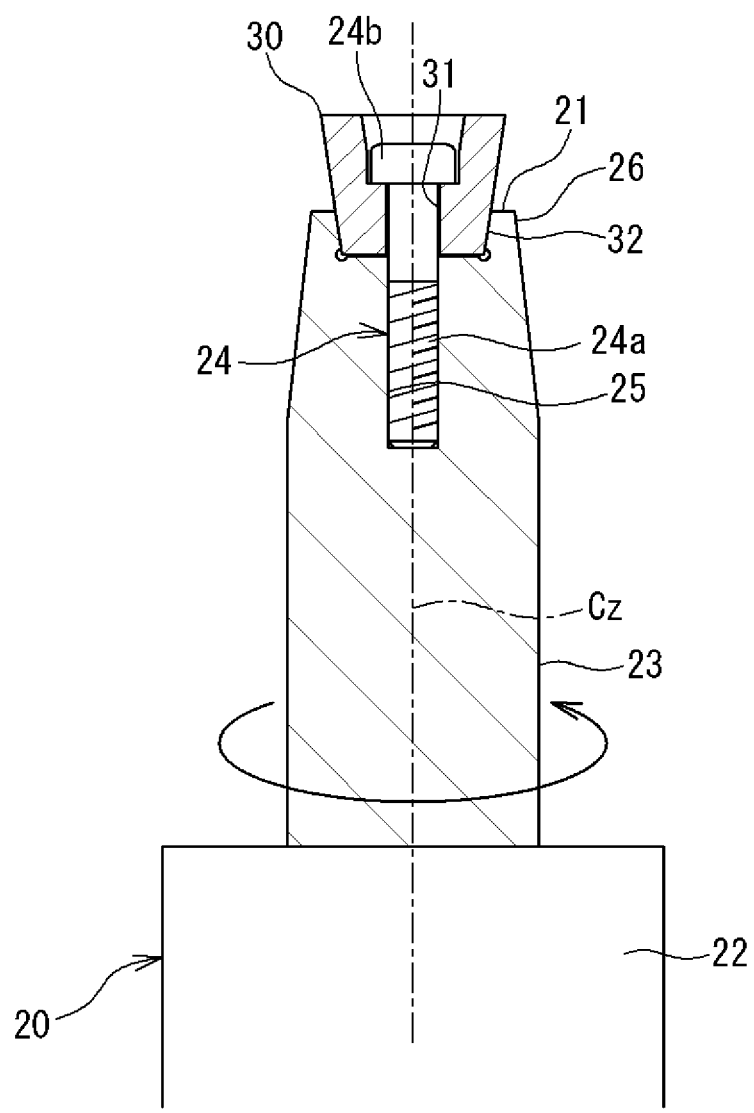
FIG. 5 is an explanatory diagram of the tool.

A structure for mounting the tip 30 on the tool 20 will be described using FIG. 5. The shaft-like holder 23 is fixed to the linear shaft portion 22 of the tool 20. The tip 30 is mounted at a distal end portion of the holder 23. The tool 20 further includes the bolt 24 that fastens together the holder 23 and the tip 30. A screw hole 25 for the bolt 24 is formed along the axis line Cz in the holder 23. A through-hole 31 through which a shaft portion 24a of the bolt 24 is inserted is formed along the axis line Cz in the tip 30. The through-hole 31 is counterbored so that a head 24b of the bolt 24 cannot be inserted therein. The tip 30 can be fixed to the holder 23 by screwing the bolt 24 into the screw hole 25. The tip 30 can be dismounted from the holder 23 by loosening the bolt 24.

To prevent the tip 30 from coming off the holder 23, the tip 30 needs to be mounted on the holder 23 with such a structure that prevents undesirable rotating. The tip 30 and the holder 23 may have special shapes to prevent the undesirable rotation. In the present embodiment, however, the direction in which the bolt 24 is tightened by rotation of the bolt 24 into the screw hole 25 is opposite to the direction of rotation of the tip 30 about the axis line Cz during the cutting work. Thus, the bolt 24 is configured to be tightened by a load of the cutting. That is, when the tip 30 is in contact with the workpiece 7 and performs the cutting, the tip 30 rotates in the same direction as the tool 20, and the load is generated in the opposite direction thereof. When such a load is generated, the tip 30 causes the bolt 24 to rotate in the opposite direction with a frictional force therebetween. Making the opposite direction the same as the direction in which the bolt 24 is tightened into the screw hole 25 prevents the bolt 24 from loosening during the cutting work, thus eliminating the need for providing a structure that prevents the undesirable rotation. If the tip 30 and the holder 23 are designed to have special shapes for preventing the undesirable rotation, a problem arises that commercially available (simple-shaped) tips are difficult to be employed as the tip 30, and cost of the cutting tool increases. However, the present embodiment eliminates the need for special processing to prevent the tip 30 from coming off, and allows using the commercially available tips.

As described above, the tool 20 includes the holder 23 with the tip 30 mounted at the distal end portion thereof. The holder 23 includes an annular wall portion 26 that is in contact with an outer circumferential surface 32 of the tip 30 over the whole circumference thereof. That is, a bottomed dent hole having a circular profile centered on the axis line Cz is formed at the distal end portion of the holder 23. A part of the tip 30 is fitted into the dent hole. In this state, the tip 30 is tightened to the holder 23 by the bolt 24. This configuration allows the tip 30 to be mounted on the holder 23 while the tip 30 is prevented from vibrating, and thus allows improving the processing accuracy.

As described above, the cutting of the present embodiment is performed by the rotary cutting, and the tip 30 rotates. In this case, the life of the tip 30 is longer and the processing efficiency is higher than in the case of the ordinary single point processing. Consequently, equipment cost including the cost of the cutting tool can be reduced, and processing cost can be reduced.

As described above, the rotary cutting may be either of the driven type in which the tip 30 rotates accompanying the rotation of the workpiece 7, or of the driving type in which the tip 30 rotates by itself. The following describes the case where the driving type is employed. In the case of the driving type rotary cutting, the tip 30 is rotationally driven about the axis line Cz of the tip 30. The direction of rotation of the tip 30 is matched with the direction of rotation of the workpiece 7. That is, the tip 30 is rotated in a direction having a component of the direction of rotation of the workpiece 7. For this purpose, the head 15 (refer to FIG. 1) includes a rotational driver 17. The rotational driver 17 rotationally drives the tool 20 and the tip 30 about the axis line Cz of the tip 30. The rotational driver 17 has a configuration including a motor and a speed reducer, and has also a function to change the rotational speed of the tip 30.

Figure 7:
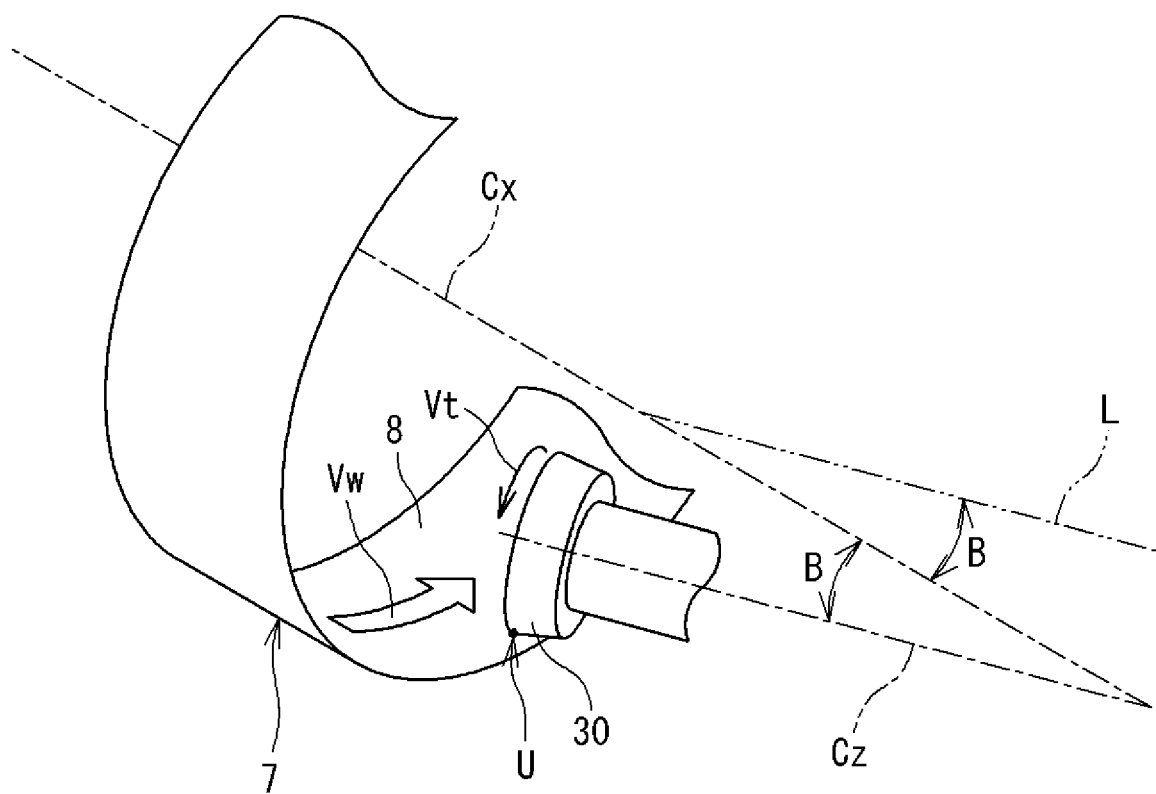
FIG. 7 is another explanatory diagram of the inner circumferential surface of the workpiece and the tip.
Figure 8:
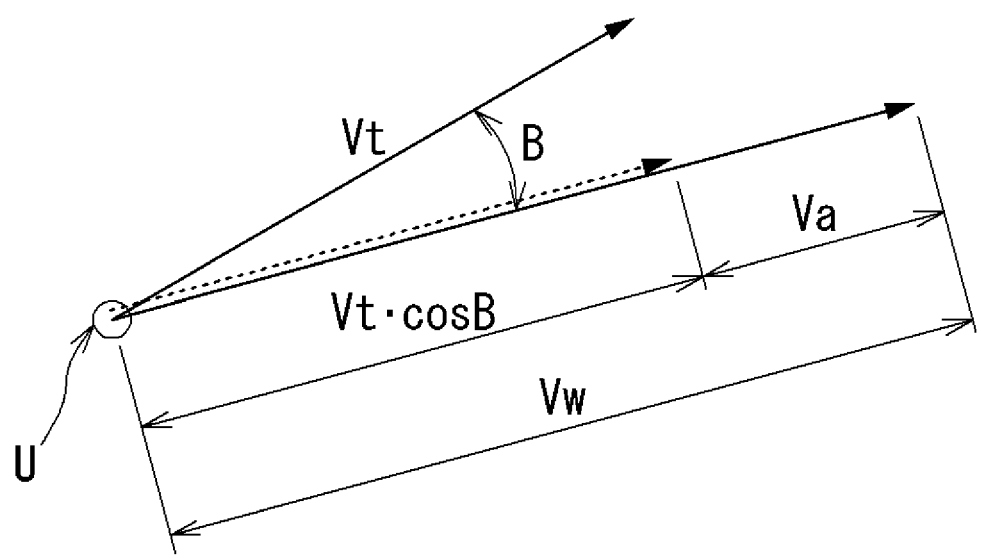
FIG. 8 is an explanatory diagram of an actual cutting speed.
Figure 9:
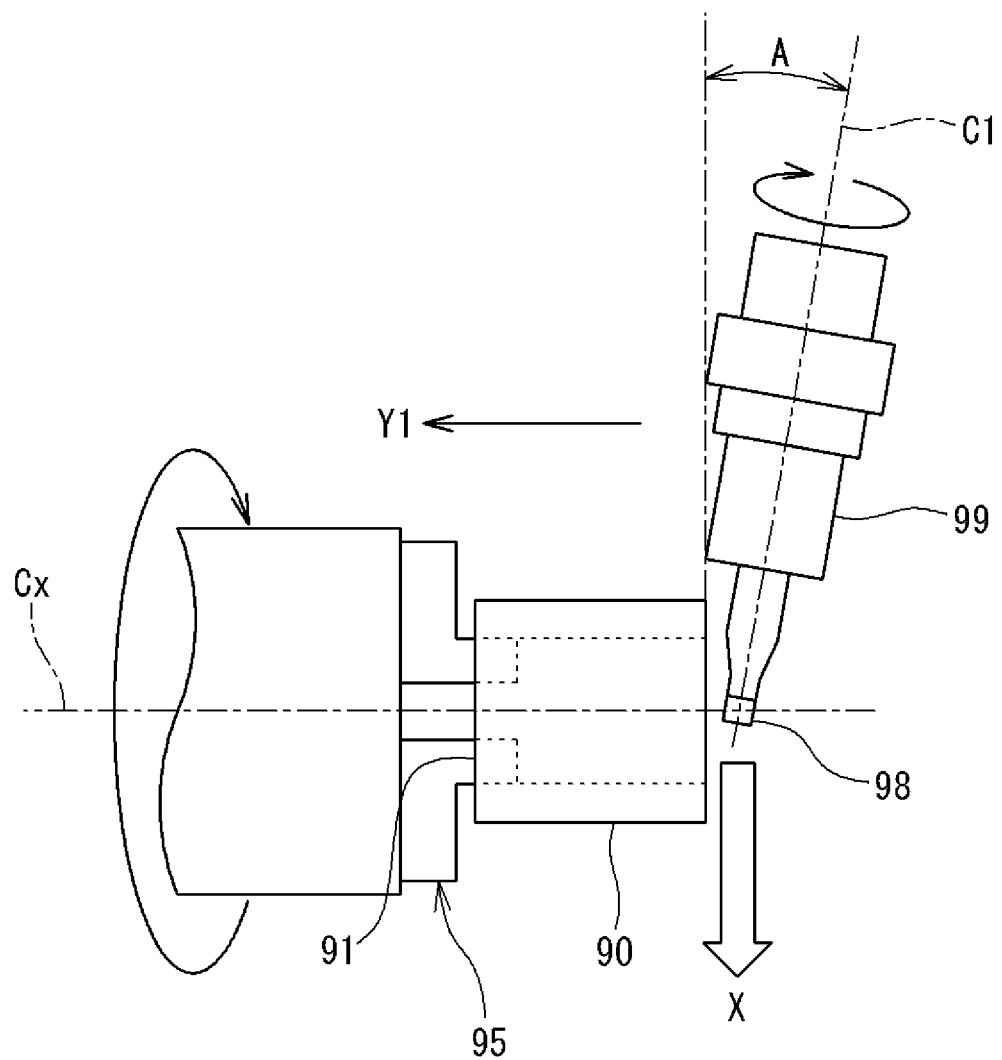
FIG. 9 is an explanatory diagram of conventional rotary cutting.
Figure 10:
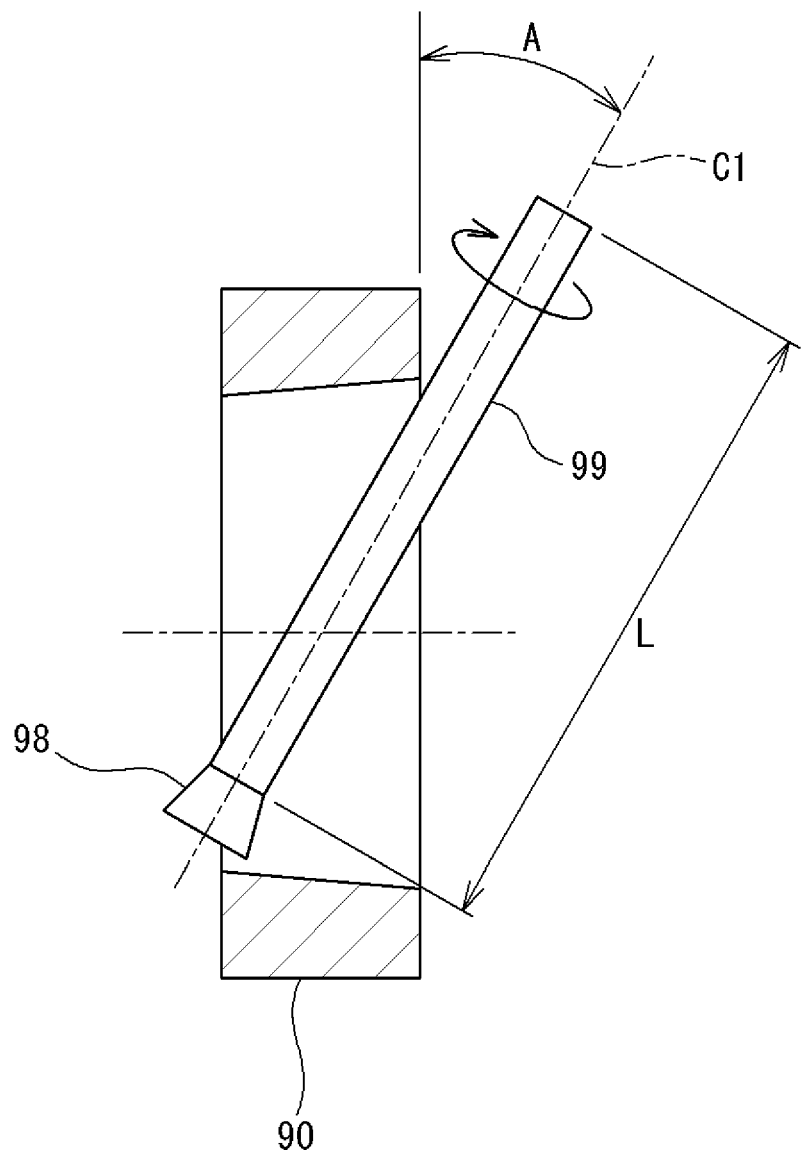
FIG. 10 is an explanatory diagram of a case where an inner circumferential surface of a hollow cylindrical workpiece is cut by the conventional rotary cutting.

FIG. 7 is an explanatory diagram of the inner circumferential surface 8 of the workpiece 7 and the tip 30. The rotational speed of the workpiece 7 about the center line Cx, that is, a workpiece cutting speed is denoted as "Vw (m/min)". The rotational speed of the tip 30 about the axis line Cz, that is, a tool cutting speed is denoted as "Vt (m/min)". In this case, the rotational speed of the workpiece 7 and the rotational speed of the tip 30 are set so as to satisfy the following relationship: Vw>Vt. Expression (1) below represents an actual cutting speed (substantial cutting speed) Va at a cutting point U (processing point) at which the tip 30 is in contact with the inner circumferential surface 8 of the workpiece 7 (refer to FIG. 8).

$$Va = Vw - Vt \cdot \cos B \quad (1)$$

The symbol "B" in Expression (1) above denotes the intersection angle between the workpiece 7 and the tip 30, which is equal to the intersection angle between the rotational center line Cx of the workpiece 7 and the imaginary straight line L parallel to the axis line Cz of the tip 30 and intersecting with the rotational center line Cx, as illustrated in FIG. 7. The term "Vt·cos B" in Expression (1) above represents a speed component of the tool cutting speed Vt in the workpiece rotation direction. Expression (1) above is an expression based on the fact that the relative speed difference in the workpiece rotation direction between the workpiece 7 and the tip 30 serves as the actual cutting speed Va. According to Expression (1), the actual cutting speed Va decreases as the angle B decreases. The angle B only needs to be reduced to reduce the actual cutting speed Va. As described above, the angle B only needs to be smaller than 45 degrees (B<45 degrees), preferably equal to or smaller than 30 degrees (B 30 degrees), and more preferably equal to or smaller than 20 degrees (B≤20 degrees).

As described above, in the driving type rotary cutting, the tip 30 is rotated about the axis line Cz with the tip 30 being oriented in such a direction that the rotational speed difference between the workpiece 7 and the tip 30 is reduced. Rotating the tip 30 with the tip 30 being oriented in the direction having the component of the workpiece rotation direction reduces the rotational speed difference between the workpiece 7 and the tip 30. That is, as indicated by Expression (1), the actual cutting speed Va at the cutting point U is reduced. Accordingly, temperature rise at the cutting point U can be reduced, thus allowing using a low-cost tip made of a material having a relatively lower oxidation-resistant temperature, as the tip 30. For example, the tip 30 may be a button tip made of carbide or coated with carbide that has a lower oxidation-resistant temperature (than cubic boron nitride (CBN)) but is lower in cost. Even in the case of the tip 30 made of carbide or coated with carbide, the temperature rise at the cutting point U can be reduced by reducing the actual cutting speed Va at the cutting point U, so that the tip 30 can be prevented, for example, from wearing at an early stage. When the rotational speed of the workpiece 7 increases, the tip 30 is rotated at a higher speed corresponding to the increase in speed. This allows reducing the rotational speed difference between the workpiece 7 and the tip 30 and reducing the actual cutting speed Va, so that the temperature rise at the cutting point U can be reduced. The feed of the tip 30 is set as an amount of travel of the tip 30 per one rotation of the workpiece. Since increasing the rotational speed of the workpiece 7 increases the feed of the tip 30, the processing efficiency is improved. The feed of the tip 30 may be set to 0.1 mm/rev, for example, and may further be set larger than this value.

In the case of the tip 30 coated with carbide, the temperature of the cutting point U needs to be conventionally reduced because the oxidation-resistant temperature is lower than that of CBN. Therefore, the cutting speed is reduced, and the reduction in the cutting speed reduces the processing efficiency. However, according to the rotary cutting of the embodiment described above, the actual cutting speed Va can be kept low even if the rotational speed of the workpiece 7 increases. Hence, the temperature rise by the cutting can be reduced, and the processing efficiency is not lowered. That is, according to the rotary cutting of the present embodiment, the tip 30 made of carbide or coated with carbide can be employed, and the cutting can be performed at a high speed, so that the processing efficiency can be is improved.

The rotational speeds of the workpiece 7 and the tip 30 are preferably set such that the actual cutting speed Va obtained by Expression (1) is equal to or lower than 100 m/min. From the viewpoint of reducing the temperature rise at the cutting point U, the actual cutting speed Va is preferably further reduced. Thus, the rotational speeds of the workpiece 7 and the tip 30 may be set such that the actual cutting speed Va is equal to or lower than 70 m/min. The lower limit value of the actual cutting speed Va may be set to, for example, 20 m/min or 30 m/min.

The description given above describes the case in which the tip 30 is the button tip made of carbide or coated with carbide. The tip 30 may, however, be other than such a button tip, and may be a button tip made of CBN having a higher oxidation-resistant temperature. In this case, the rotational speed of the workpiece 7 can be further increased, and thus, the processing efficiency can be further increased.

In the rotary cutting operations described above, the feed direction of the tip 30 with respect to the inner circumferential surface 8 of the workpiece 7 is set to the direction from the second side S2 toward the first side S1 in the axial direction of the workpiece 7. This rotary cutting is said to be an axial feed technique.

The embodiment disclosed above is merely an example in all respects, and is not limitative. That is, the cutting method and the cutting apparatus of the present invention are not limited to the form illustrated herein, and may take another form within the scope of the present invention. For example, the chucking device 14 may take another form, and may have a configuration including claws that catch an outer circumferential surface of the workpiece 7 from radial directions. The feed mechanism 16 may also take another form. Although the embodiment describes the case in which the inner circumferential surface 8 of the workpiece 7 is a tapered shape, the inner circumferential surface 8 may be a cylindrical shape that is linear in the axial direction. In the present embodiment, the center line Cx of the workpiece 7 is horizontal and the axis line Cz of the tip 30 is also horizontal. The axis line Cz may, however, be slightly inclined with respect to a horizontal plane (for example, at an angle of 10 degrees or smaller with respect to the horizontal plane). The cutting of the embodiment described above can be applied to the outer circumferential surface of the hollow cylindrical or cylindrical workpiece. In this case, the "inner circumferential surface" in the description given above only needs to be replaced with the "outer circumferential surface". In the case of the driving type rotary cutting, the cutting may be performed while the tip 30 rotates in the direction opposite to the direction of rotation of the workpiece 7.

According to the present invention, the inner circumferential surface can be processed without interference of the tool with the hollow cylindrical workpiece; the distortion of the workpiece due to the holding force of the chucking device can be reduced; and the high processing accuracy can be ensured.

What is claimed is:

1. A cutting method for cutting an inner circumferential surface of a rotating hollow cylindrical workpiece by use of a linear tool with a button tip mounted at a distal end of the linear tool, the cutting method comprising:
   holding the workpiece with a chucking device in a state where a side surface of the workpiece on a first side in an axial direction of the workpiece is in contact with a contact surface of the chucking device;
   setting an intersection angle between a rotational center line of the workpiece and an imaginary straight line to an angle smaller than 45 degrees, the imaginary straight line being parallel to an axis line of the button tip and intersecting with the rotational center line of the workpiece; and
   setting a feed direction of the button tip to the inner circumferential surface of the workpiece to a direction from a second side in the axial direction of the workpiece toward the first side in the axial direction of the workpiece, and cutting the inner circumferential surface of the workpiece by use of the button tip rotating about the axis line.

2. The cutting method according to claim 1, wherein
when a first region is assumed to be on one side of a vertical imaginary plane including the rotational center line of the workpiece, and a second region is assumed to be on an other side of the vertical imaginary plane, a linear shaft portion included in the linear tool is disposed so that the linear shaft portion extends from the first region to the second region and so that the distal end of the linear tool faces the second region, and
the button tip mounted at the distal end of the linear tool comes in contact with the inner circumferential surface of the workpiece in the second region.

3. The cutting method according to claim 1, wherein
the button tip is rotated about the axis line with the button tip being oriented in such a direction that a rotational speed difference between the workpiece and the button tip is reduced.

4. A cutting apparatus that cuts an inner circumferential surface of a rotating hollow cylindrical workpiece, the cutting apparatus comprising:
   a chucking device that has a contact surface configured to contact with a side surface of the workpiece on a first side in an axial direction of the workpiece, and that is configured to hold the workpiece;
   a linear tool with a button tip mounted at a distal end of the linear tool;
   a head that has the linear tool mounted thereon such that an intersection angle between a rotational center line of the workpiece and an imaginary straight line parallel to an axis line of the button tip and intersecting with the rotational center line of the workpiece is smaller than 45 degrees, and that rotatably supports the linear tool; and
   a feed mechanism that includes a motor, a speed reducer that reduces a speed of a motor output of the motor, and a ball screw rotated by the motor, and configured to feed the button tip along the inner circumferential surface of the workpiece in a direction from a second side in the axial direction of the workpiece toward the first side in the axial direction of the workpiece, wherein
   the contact surface of the chucking device includes a recess to receive a portion of the button tip during machining of the inner circumferential surface adjacent to the first side of the workpiece.

5. The cutting apparatus according to claim 4, wherein
the linear tool includes a holder with the button tip mounted at a distal end portion of the holder and a bolt that fastens together the holder and the button tip,
a through-hole through which a shaft portion of the bolt is inserted is formed along the axis line in the button tip,
a screw hole for the bolt is formed in the holder, and
a direction in which the bolt is tightened by rotation of the bolt into the screw hole is opposite to a direction of rotation of the button tip about the axis line during cutting work.

6. The cutting apparatus according to claim 4, wherein
the linear tool includes a holder with the button tip mounted at a distal end portion of the holder, and
the holder includes an annular wall portion that is in contact with an outer circumferential surface of the button tip over a whole circumference of the button tip.

7. The cutting apparatus according to claim 4, wherein
the head includes a rotational driver configured to rotationally drive the linear tool and the button tip about the axis line of the button tip, and is configured to rotate the button tip with the button tip being oriented in such a direction that a rotational speed difference between the workpiece and the button tip is reduced.

8. The cutting apparatus according to claim 4, wherein
the feed mechanism is configured to feed the button tip in the axial direction of the workpiece from the second side of the workpiece to a position that is at least halfway between the second side of the workpiece and the first side of the workpiece.

9. The cutting apparatus according to claim 4, wherein
the feed mechanism is configured to feed the button tip in the axial direction of the workpiece from the second side of the workpiece to the first side of the workpiece.

10. A cutting apparatus that cuts an inner circumferential surface of a rotating hollow cylindrical workpiece, the cutting apparatus comprising:
   a chucking device that has a contact surface configured to contact with a side surface of the workpiece on a first side in an axial direction of the workpiece, and that is configured to hold the workpiece;

a linear tool with a button tip mounted at a distal end of the linear tool;

a head that has the linear tool mounted thereon such that an intersection angle between a rotational center line of the workpiece and an imaginary straight line parallel to an axis line of the button tip and intersecting with the rotational center line of the workpiece is smaller than 45 degrees, and that rotatably supports the linear tool; and a feed mechanism that includes a motor, a speed reducer that reduces a speed of a motor output of the motor, and a ball screw rotated by the motor, and configured to feed the button tip along the inner circumferential surface of the workpiece in a direction from a second side in the axial direction of the workpiece toward the first side in the axial direction of the workpiece, wherein a length of the linear tool with the button tip in the axial direction of the workpiece is longer than a length of the workpiece in the axial direction of the workpiece, and the linear tool when disposed inside of the workpiece does not to interfere with the inner circumferential surface of the workpiece.

11. The cutting apparatus according to claim 10, wherein the contact surface of the chucking device includes a recess to receive a portion of the button tip during machining of the inner circumferential surface adjacent to the first side of the workpiece.

12. The cutting apparatus according to claim 10, wherein the linear tool includes a holder with the button tip mounted at a distal end portion of the holder and a bolt that fastens together the holder and the button tip, a through-hole through which a shaft portion of the bolt is inserted is formed along the axis line in the button tip, a screw hole for the bolt is formed in the holder, and a direction in which the bolt is tightened by rotation of the bolt into the screw hole is opposite to a direction of rotation of the button tip about the axis line during cutting work.

13. The cutting apparatus according to claim 10, wherein the linear tool includes a holder with the button tip mounted at a distal end portion of the holder, and the holder includes an annular wall portion that is in contact with an outer circumferential surface of the button tip over a whole circumference of the button tip.

14. The cutting apparatus according to claim 10, wherein the head includes a rotational driver configured to rotationally drive the linear tool and the button tip about the axis line of the button tip, and is configured to rotate the button tip with the button tip being oriented in such a direction that a rotational speed difference between the workpiece and the button tip is reduced.

15. The cutting apparatus according to claim 10, wherein the feed mechanism is configured to feed the button tip in the axial direction of the workpiece from the second side of the workpiece to a position that is at least halfway between the second side of the workpiece and the first side of the workpiece.

* * * * *